July 23, 1968  R. D. DODGE  3,393,788
IMPRESSION CONTROL MEANS WITH RANGE CONTROL DEVICE
Filed Dec. 28, 1966  4 Sheets-Sheet 1

INVENTOR.
RONALD D. DODGE

BY John W. Girvin, Jr.

ATTORNEY.

July 23, 1968 R. D. DODGE 3,393,788
IMPRESSION CONTROL MEANS WITH RANGE CONTROL DEVICE
Filed Dec. 28, 1966 4 Sheets-Sheet 4

3,393,788
IMPRESSION CONTROL MEANS WITH
RANGE CONTROL DEVICE
Ronald D. Dodge, Lexington, Ky., assignor to International Business Machines Corporation, Armonk, N.Y., a corporation of New York
Filed Dec. 28, 1966, Ser. No. 605,455
11 Claims. (Cl. 197—17)

ABSTRACT OF THE DISCLOSURE

An apparatus for obtaining uniform print impressions for both upper and lower case characters over a range of impression settings. The apparatus has a set of independently variable adjustable members for upper case characters and a corresponding set of adjustable members for lower case characters. The upper case adjustable members are varied as a group by a first group impression control device and the lower case adjustable members are varied as a group by a second group impression control device over the impression range. The variation in print impression effected by either group impression device can be varied by a range control device. Additionally, the effective range of impression variation can be changed. A single stop surface for each typebar position is utilized. The stop surfaces are responsive to their associated adjustable members and to both group impression devices.

CROSS REFERENCES TO RELATED APPLICATIONS

"Shift Delay Mechanism," invented by Ronald D. Dodge and Benjamin T. Crutcher, filed Dec. 28, 1966, Ser. No. 605,322 and assigned to the assignee of the present invention.

BACKGROUND OF THE INVENTION

This invention relates to a print impression control apparatus, and more particularly, to an improved typebar actuating and impression mechanism for a power driven typewriter.

It can be readily appreciated that, in order for a typed page to have a degree of aesthetic perfection required in modern business, each of the type characters should have the same color density or color shade regardless of the size of the characters, and regardless of whether it happens to be a lower case or upper case character. Additionally, it is desirous to change the color density of the characters as a group while still maintaining approximate density uniformity as between each type character.

Most modern typewriting machines are equipped with typebar drive mechanisms which cause the various typebars to strike the typed page or document with varying amounts of force thereby causing color density variations from typebar position to typebar position. Additionally, since the density of impression will vary inversely with the size of the characters, the striking force which causes a large character such as the letter "M" to print lightly will, when applied to a small character such as the period "symbol," cause it to print with excessive darkness. The prior art typewriting machines have frequently been provided with adjustment mechanisms which permit the striking force of each typebar to be set at any desired level so that the color density of the character on that typebar will match the color density of some reference character. Since there is one such adjustment mechanism for each individual typebar, and since adjustment thereof only affects the striking force of one typebar, such adjustment mechanism will hereinafter be referred to as individual adjustment mechanism.

Most typewriting machines are equipped with typebars which have both an upper case and a lower case character thereon. There is usually a size difference between the upper and lower case characters in addition to a striking force variation, with the result that the upper and lower case characters of the same typebar print with different color densities.

A second individual adjustment mechanism is often provided on prior art machines having both upper and lower case characters on the same typebar. One individual adjustment mechanism is then utilized to set the striking force of the typebar at a desired level for the upper case character and the second individual adjustment mechanism is utilized to set the striking force at a different level for the lower case character so that the color density of both upper and lower case characters on that typebar will match the color density of some reference character. Such devices, however, are often complex and require interlock mechanisms to insure that a character is not struck during a shifting operation (e.g., shifting from one individual adjustment mechanism to the second adjustment mechanism when shifting from one letter case to the other letter case).

It can readily be appreciated that, as a matter of preference, the operator may desire to increase or decrease the color density of all the characters as a group, or to vary the penetration of the various type characters into the surface of the work, for example, in paper plate or wax stencil work.

In the prior art, it has been common, to provide means for increasing or decreasing the striking force of all of the typebars as a group by substantially equal amounts in order to raise or lower the overall level of color density as desired by the operator. This type of adjustment will hereinafter be referred to as group density control. In one type of prior art device, the group density control affected the striking force of both the upper case and the lower case characters in substantially equal amounts. Consequently, the color density of the small lower case characters were not changed in the same degree as the large upper case characters since a change in striking force causes a greater density variation for smaller characters than for larger ones. Hence, the color density of upper and lower case characters was not uniform over the desirable group density range.

Another prior art device utilizes two individual adjustment mechanisms for each typebar and is arranged so that the group impression control affects the upper case individual adjustment mechanism differently than the lower case individual adjustment mechanisms. However, in addition to necessitating complex interlocks, this device does not lend itself to manufacturing flexibility wherein it is desired to use typebars having many styles of type fonts. That is, since the striking force requirements of upper case characters with respect to the striking force of requirements of lower case characters over a density range varies with the type style utilized on the typebar, prior art typewriters must be manufactured on an individual basis with each typewriter machine being critically tuned to the type style utilized.

In order to overcome the above problems of the prior art and to provide a machine which can readily be manufactured without necessitating special parts and complex adjustments to compensate for varying type styles, the typewriter machine of the present invention is provided with a first plurality of individually adjustable members for regulating the striking force of the lower case characters of each typebar with respect to each other typebar and a second plurality of individually adjustable members for regulating the striking forces of the upper case characters of the typebars with respect to each other.

Group control means are provided to uniformly vary all of the upper case adjustable elements as a group and additional group control means are provided to uniformly vary all of the lower case adjustable elements as a group in accordance with the print density desired and in accordance with the media typed upon. Range matching means are provided to change the uniform variations effected by the group control means. Additionally, range limiting means are provided to limit the range variation effected by the machine operator for certain type styles. A further feature is the combinational utilization of the above features with a secondary knock-off feature which limits the force imparted to preselected characters having small surface areas to a fixed maximum force. A further feature is the utilization of a continuous stop surface which is responsive to both a first individually adjustable member and a second individually adjustable member thereby eliminating the need for complex interlocks.

The foregoing and other features and advantages of the invention will be apparent from the following more particular description of the preferred embodiment of the invention as illustrated in the accompanying drawings.

Figure 1:
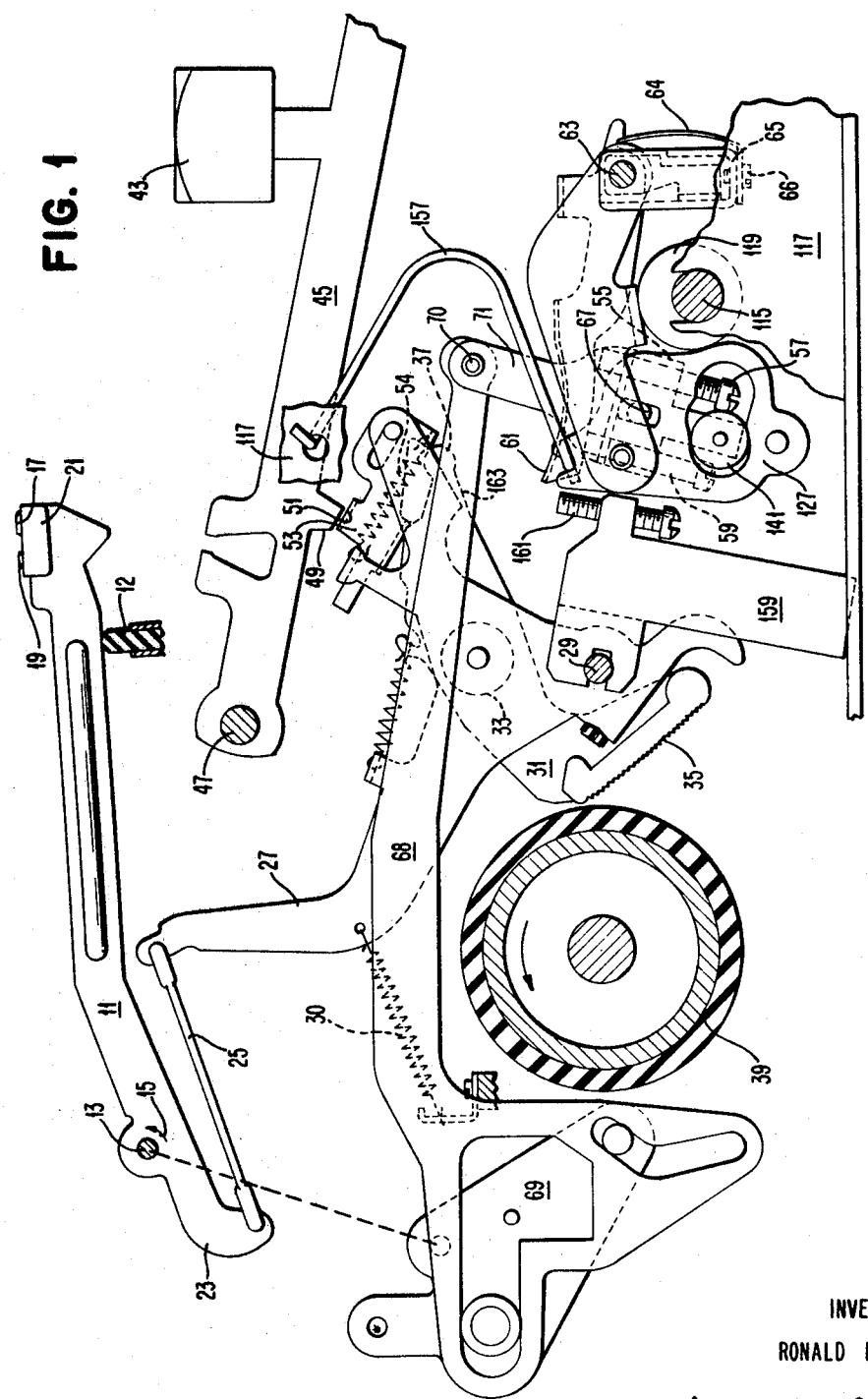
FIGURE 1 is a side elevational view partly in cross section of a typebar and its associated driving mechanism.

Referring now to the drawings, and more particularly to FIGURE 1, a side elevation view of a typebar and its associated driving mechanism is shown. In order to effect printing, the typebar 11 shown in its rest position resting on typebar rest 12 is pivoted about pivot wire 13 in direction of arrow 15. Either upper case character 17 or lower case character 19 located on print head 21 of the pivoting typebar 11 strikes an inked ribbon (not shown) driving it into a document form (not shown) mounted on the typewriter platen (not shown) thereby causing an impression to be made on the form. The lower arm 23 of typebar 11 is connected through a link 25 to the cam lever 27 which is mounted for rotation about cam lever fulcrum rod 29. In order to effect a pull on the lower arm 23 of the typebar 11 and thereby cause it to rotate about pivot wire 13 for a print stroke, cam lever 27 is rotated. The cam lever spring 30 returns the cam lever to its initial position at the end of a print stroke.

Cam lever 27 is rotated by print cam 31 which is mounted for rotation about cam rivet 33. Print cam 31 has a plurality of serrated teeth 35 at one end thereof and has an end portion 37 at its opposite end. The print cam 31 is rotated when the serrated teeth 35 are caused to engage the switch controlled continuously rotating power roll 39. The power roll 39 has a resilient covering thereon thereby enabling the serrated teeth 35 to bite into the power roll. Cam spring 41 restores the cam to its initial position at the end of the powered movement.

In order to place the print cam 31 in a driven relation with the power roll 39, key button 43 located on keylever 45 is depressed by the operator thereby causing the keylever to rotate about fulcrum rod 47. Lug 49 of keylever 45 contacts the top lug 51 of the cam trip lever 53. The cam trip lever 53 is pivoted to the cam lever 27 and pivots down against the cam 31, causing the cam to engage the power roll 39 and to effect the subsequent rotation of typebar 11 for a print stroke. The cam trip lever is restored by trip lever spring 54.

The typebar drive described above is the same as that found in the IBM Model C Electric Typewriter and is described in greater detail in the IBM Customer Engineering Instruction Manual entitled, "Standard Typewriter Model C-1" form number 241–5065–1, copyright 1960 by International Business Machines Corporation, 590 Madison Ave., New York 22, N.Y.

While the above and the following description relate generally to only one typebar and its associated mechanism, it is to be understood that the same structure applies to all typebars in a typewriter.

As is appreciated by those skilled in the art, the density of the impression that each typebar makes on the document form is a function of both the striking force of the typebar and the surface area of the characters located on the typebar. Since the area of each character is fixed for a given type style, the striking forces of each typebar must be adjusted relative to each other in order to obtain print density uniformity and the striking forces of all of the typebars as a group must be varied to vary the print density.

The striking force of the typebar will depend in part on the time interval during which the serrated teeth 35 of print cam 31 are drivingly connected to power roll 39, the geometry of the typebar linkage which varies from character position to character position around the type basket, and the geometry of the typebar linkage which varies in accordance with the case of the character to be typed. In order to compensate for variations in print density caused by the various sized characters and by striking force variations caused by the geometry of the type basket, the time interval during which the print cam 31 is drivingly connected to the power roll is varied.

Accordingly, a T shaped primary knock-off bar 55 is provided with a plurality of individually adjustable upper case knock-off screws 57 and a like plurality of individually adjustable lower case knock-off screws 59. Each upper case knock-off screw is grouped with a lower case knock-off screw and each such group of knock-off screws has a knock-off finger 61 associated therewith which rests upon either the upper case knock-off screw or upon the lower case knock-off screw.

Adjustment of the knock-off screw varies the relative position of each knock-off finger 61 with respect to the end portion 37 of its associated print cam 31. When print cam 31 rotates about cam rivet 33, the end portion 37 of the print cam contacts its associated knock-off finger 61 thereby inhibiting the cam from further rotation. The distance between the knock-off fingers 61 and the end portion 37 of the print cam thus determines the time duration which the print cam is drivingly connected to the power roll 39. This distance will hereafter be referred to as the print cam clearance distance.

The knock-off fingers 61 are pivotally mounted on rod 63 and each is biased against either upper case knock-off screw 57 or lower case knock-off screw 59 as will be discussed by its associated column spring 64. Thus, while the knock-off fingers are not fixedly mounted to the primary knock-off bar 55, the angular displacement from the horizontal that each knock-off finger assumes is a function of the height of its associated knock-off screws which are fixably mounted to the primary knock-off bar. The knock-off fingers function to prevent the end portion 37 of the print cam 31 from falling between upper case knock-off screw 57 and the lower case knock-off screw 59 during a shifting operation as will become apparent from the following discussion. The column springs 64 are bent under U-shaped bracket 65 and held in place by screws 66 which pass through both the springs and the U-shaped bracket.

The primary knock-off bar 55 is mounted to pivot about stud 67. When typing lower case characters, the position of the primary knock-off bar is as shown in FIGURE 1. It is to be noted that the lower case knock-off screw 59 is supporting knock-off finger 61. When it is desirous to print upper case characters, the link 68 is pulled to the left by the shift control mechanism 69 as described in copending patent application Ser. No. 605,322 entitled, "Shift Delay Mechanism" filed concurrently herewith. When link 68 moves to the left, it effects a pull through pin 70 on bracket 71 which is fixably attached to the primary knock-off bar 55 thereby rotating the knock-off bar about stud 67. When link 68 has moved to its leftmost position, the knock-off fingers 61 will rest upon upper case knock-off screws 57.

Thus, the print cam clearance distance and hence striking force of each typebar can be adjusted with respect to each other typebar in both upper case and lower case modes by adjusting the individually adjustable upper case knock-off screws 57 and lower case knock-off screws 59. As is appreciated by those skilled in the art, these individual adjustments are made in accordance with the force requirements of the corresponding typebars relative to one another. That is, the typebars having characters with relatively large areas as opposed to those of relatively small areas require a greater amount of impact force to achieve the same character print density. Hence, the knock-off screws associated with typebars having relatively large characters thereon are adjusted so that the print cam clearance distance between their associated knock-off fingers 61 and corresponding end portions 37 of print cams 31 is relatively large compared with that of typebars having smaller characters thereon.

Additionally, the typebars located in the center of the type basket are propelled toward the platen at a greater velocity than typebars located at the edge of the type basket due to the geometrical placement of the typebars within the type basket. Thus, the cam clearance distance associated with typebars in the center of the type basket is made smaller than the cam clearance distance associated with typebars at the edge of the type basket.

Further, all typebars are propelled toward the platen at a great velocity when printing upper case characters than when printing lower case characters. This is because pivot wire 13 is shifted downward by shift control mechanism 69 through linkage (not shown) when shifting to upper case thereby changing the angular relationship between typebar 11, its pivot point 13, link 25, cam lever 27 and print cam 31. This change in angular relationship causes the serrated teeth 35 of print cam 31 to bite deeper into the resilient coating of the power roll 39 upon engaging the power roll than when typing lower case characters. The stored energy in the resilient coating is imparted to the typebar during the print stroke resulting in higher velocities for upper case printing. Accordingly, the lower case knock-off screws 59 are adjusted to give a greater print cam clearance distance than that obtained by the corresponding upper case knock-off screws 57. With all of the above factors in mind, the upper case knock-off screws 59 can be adjusted so that for a given group density setting, print uniformity is virtually achieved.

Thus far, the individual print density controls have been described. The individual print density controls co-act with the group density controls to effect approximate uniform print density over a range of print densities as will be described hereinafter.

Figure 2:
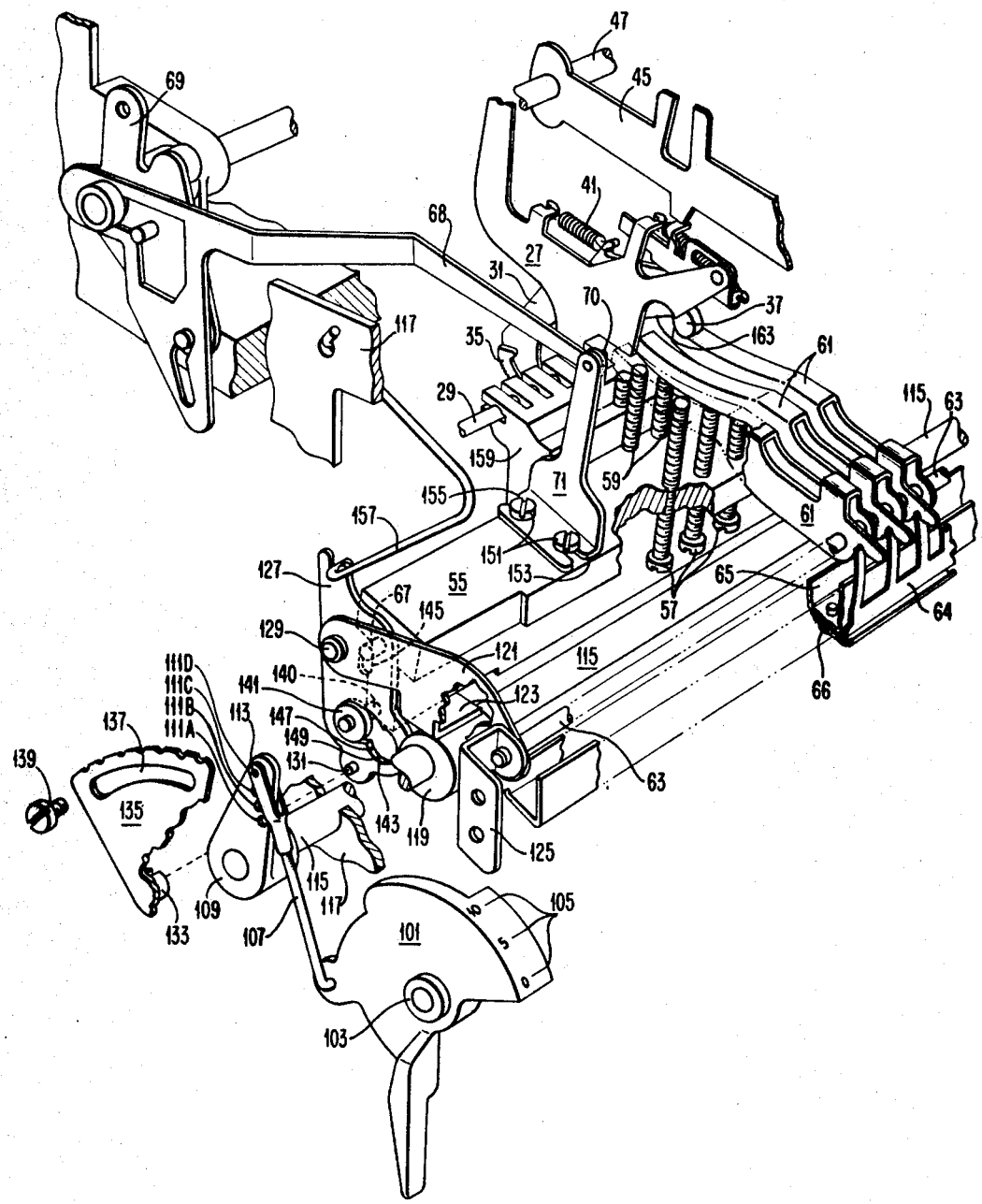
FIGURE 2 is a partially exploded perspective view of the primary and secondary knock-off bars and their associated mechanisms.

Referring now to FIGURE 2, an exploded perspective view of the primary knock-off bar 55 and its associated mechanism is shown. As described above, upper case knock-off screws 57 and lower case knock-off screws 59 are adjustable to vary the print cam clearance distance between the end portions 37 of the print cams 31 and their associated knock-off fingers 61. Group density change is effected by changing the height of the knock-off bar 55 thereby changing the height of the knock-off screws as a group. When, for example, the knock-off fingers 61 are resting on the lower case knock-off screws 59 as shown in FIGURE 2 and the primary knock-off bar 55 is moved upward by a fixed increment, the print cam clearance distance for each typebar position is decreased by an amount proportional to that fixed increment. Similarly, if the knock-off fingers 61 were resting on the upper case knock-off screws 57, and the primary knock-off bar were moved upward by a fixed increment, the print cam clearance distance for each print position would be decreased by an amount proportional to that increment.

In order to change the height of the primary knock-off bar 55 and thereby effect a group density change, density control lever 101 is rotated about fixed pivot stud 103. Various markings or scales 105 may be inscribed on the density control lever 101 to indicate to the operator what print density has been selected. The rotation of the density control lever 101 effects a pull on link 107 which is mounted at one end to the density control lever and which is pinned at its opposite end to range control member 109. The range control member 109 has a plurality of holes 111 adapted to receive pin 113 to effect a pinned connection between link 107 and the range control member. The selective connection of link 107 to one of the holes in the range control member 109 gives the mechanism added group density impression range control as will be discussed hereinafter in the operation portion of the specification.

Range control member 109 is mounted on shaft 115 which rests upon machine frame 117. Shaft 115 extends across the width of the machine and rests upon the machine frame (not shown) at its opposite end. It will be appreciated by those skilled in the art that all of the group density control means including the range matching control mechanism to be hereinafter described and which are located on the left-side of the primary knock-off bar 55 have counter parts which are located on the right-hand side of the primary knock-off bar.

Movement of link 107 causes the range member 109 to rotate about the axis of shaft 115 thereby causing shaft 115 to rotate about its axis. Rotation of shaft 115 causes the eccentrically mounted impression cam 119 to rotate. Cam follower arm 121 which is pivotally mounted to rod 63 has a surface 123 which rests upon impression cam 119. Rod 63 which also supports knock-off fingers 61 is mounted in bracket 125 which in turn rests upon the machine frame. The opposite end of cam follower arm 121 is pivotally mounted to gyration control plate 127 by pivot pin 129. Gyration control plate 127 has a guide pin 131 fixedly attached thereto. The guide pin is located in the slotted guide 133 of the impression control guide 135.

Rotation of cam 119 causes the cam follower arm 121 to pivot about rod 63. This motion is translated through pivot pin 129 to cause movement of gyration control plate 127. The gyration control plate moves in a direction which is determined by the alignment of slotted guide 133. When the slot of the slotted guide 133 is vertically aligned as shown in FIGURE 2, the gyration control plate 127 will move in a vertical direction. If the slot of the slotted guide 133 were aligned at an angle of other than 90° with respect to the horizontal, the gyration control plate 127 would move in both a vertical and a horizontal direction while turning about pivot pin 129.

Impression ratio control guide 135 has a curved slot 137 cut therein. The shank portion of adjustment screw 139 passes through the slot and is secured to the machine frame. When the adjustment screw is tightened down upon the impression ratio control guide 135, the impression ratio control guide is prevented from rotating. When the adjustment screw 139 is loosened, the impression ratio control guide 135 can be rotated about an axis defined by the center of the slot of the slotted guide 133 so that the slot of the slotted guide 133 can be aligned in different directions. As mentioned above, the alignment of the slot of the slotted guide 133 determines the direction that the gyration control plate 127 will move upon movement of cam follower arm 121.

Both horizontal and vertical motion of the gyration control plate 127 effects vertical movement of the primary knock-off bar 55 as will be described hereinafter. The primary knock-off bar 55 has mounted thereto a stud 140 which supports roller 141 which rests in the internally cut kidney shaped cam 143 of the gyration control plate 127. Additionally, the gyration control plate has a cut therein a guide slot 145 for stud 67 of primary knock-off bar 55. It will be recalled from the discussion above that the primary knock-off bar 55 pivots about stud 67 when link 68 is moved to the left in response to an upper case shift operation. When the primary knock-off bar 55 so pivots about stud 67, roller 141 rolls to the right in the kidney shaped cam 143 and assumes a position resting on the right-hand side of the kidney shaped cam. As will become apparent from the discussion which follows, the left-side of the kidney shaped cam controls the group impression of the lower case characters while the right side controls the group impression of the upper case characters.

When the gyration control plate 127 moves in a vertical direction, it acts through the surface of the kidney shaped cam 143, roller 141, and stud 140 to cause the primary knock-off bar 55 to move a corresponding amount in a vertical direction. When the gyration control plate 127 is moved in a horizontal direction, roller 141 rolls along the kidney shaped cam 143 a distance depending upon the amount of horizontal motion of gyration control plate 127. If the kidney shaped cam is cut so that different points along the surface of the cam such as those denoted by reference lines 147 and 149 are different distances from pivot pin 129 about which the gyration control plate 127 pivots, horizontal movement of the gyration control plate 127 will result in a change in the vertical position of the primary knock-off bar 55. However, if the points along the surface of the kidney shaped cam 143 are on an equal radius from pivot pin 129, horizontal motion of the gyration control plate 127 will not affect the vertical position of the primary knock-off bar 55.

A unique feature of this invention is that the left-hand side of the kidney shaped cam is cut so that all points along its surface are an equidistant radius from pivot pin 129 while the right-hand side of the kidney shaped cam is cut so that different points along the surface of the cam are at different distances from the pivot pin 129. Since the roller 141 rests in the left-hand portion of the kidney shaped cam 143 when typing lower case characters and in the right-hand side of the kidney shaped cam when typing upper case characters, horizontal motion of the gyration control plate 127 has no effect on the vertical position of the primary knock-off bar 55 when typing lower case characters but causes the primary knock-off bar 55 to move vertically when typing upper case characters.

Thus, when typing upper case characters only, the amount of vertical movement of the primary knock-off bar can be varied in accordance with the amount of horizontal movement of the gyration control plate 127. This amount of horizontal movement of the gyration control plate is a function of both the alignment of the slot of the slotted guide 133 located on impression ratio control guide 135 and the angle that the impression cam 119 is rotated through. When typing lower case characters, horizontal movement of the gyration control plate 127 does not cause the primary knock-off bar 55 to move vertically, thus, rotation of the impression ratio control guide 135 from one position to another causing realignment of the slot of the slotted guide 133 has no effect on the print density of lower case characters throughout the entire range of impression defined by rotating the impression cam 119. This feature enables one to readily match the print densities of upper case characters to lower case characters over the entire density range.

It is, of course, recognized by those skilled in the art that the left-hand portion of the kidney shaped cam 143 over which roller 141 moves when typing lower case characters could be cut so that points along its surface are not equidistant from pivot pin 129. In this instance, the primary knock-off bar would move in a vertical direction when gyration control plate 127 is moved in a horizontal direction much in the same manner as described above with the respect to the upper case characters. Conversely, the right-hand portion of the kidney-shaped cam 143 can be cut so that points along its surface are equidistant from pivot pin 129. Thus, one is able to select whether horizontal motion of gyration control plate causes the knock-off bar to move vertically when typing upper case only, lower case only, or when typing both cases.

Additionally, the initial placement of the roller 141 in the kidney shaped cam 143 controls the vertical excursion of the primary knock-off bar 55. For example, for a given amount of horizontal motion of the gyration control plate 127 as controlled by the alignment of the slot of the slotted guide 133 and by the angular excursion of impression cam 119, the roller 141 may move from line 147 to line 149 in kidney shaped cam 143. When it is desirous to change the portion of the surface of kidney shaped cam 143 over which roller 141 rolls without changing the amount of horizontal movement of the gyration control plate 127 (by changing the alignment of the slotted guide 133 or changing the angle through which impression cam 119 rotates), the location of bracket 71 with respect to primary knock-off bar 55 can be varied. Bracket 71 is connected to the primary knock-off bar by adjusting screws 151. The bracket 71 has two slots 153 and 155 cut therein which allows the bracket 71 to be slidably moved in the direction of the slots when the adjustment screws 151 are loosened. The placement of bracket 71 with respect to the primary knock-off bar 55 determines the position of the roller 141 with respect to the surface of the kidney shaped cam 143 for a given group print density setting.

Since the primary knock-off bar 55 and the gyration control plate 127 upon which the primary knock-off bar rests are not fixedly mounted to the machine frame, hold down springs 157 are provided to keep the primary knock-off bar and the gyration control plate in place in case the typewriter incorporating these features is inverted. The hold down spring 157 is secured at one end to the gyration control plate 127 and is attached to the machine frame 117 at its opposite end.

Referring once again to FIGURE 1, secondary knock-off bar 159 is shown fixably secured to the base of the machine frame 117. In addition to supporting the cam lever fulcrum rod 29, the secondary knock-off bar has mounted thereon a plurality of secondary knock-off screws 161. The secondary knock-off screws are associated with typebars having characters such as the period "." or comma "," which have small surface areas. The secondary knock-off screws function to intercept the side portion 163 of the print cam 31 before the end portion 37 of the print cam 31 strikes its associated knock-off finger 61. It can readily be appreciated that the secondary knock-off screw 161 will not contact the side portion 163 of the print cam 31 if the end portion 37 of the print cam 31 first strikes its associated knock-off finger 61. Thus, if the knock-off finger 61 is adjusted so that the cam clearance distance is relatively small, the secondary knock-off screws will have no effect. However, if the knock-off finger is lowered so that the cam clearance distance is relatively large, the secondary knock-off screw contacts the side portion 163 of the print cam 31 thereby preventing the end portion 37 of the print cam from contacting its associated knock-off finger 61. Thus, once the secondary knock-off screw becomes effective, further increase of the print cam clearance distance has no effect upon the print impression of the typebar.

As can readily be appreciated by those skilled in the art, the utilization of secondary knock-off allows the machine operator to utilize high density settings for multiple form work without incurring form cutting when printing characters having relatively small surface areas. A more complete description of secondary knock-off is found in U.S. Patent 3,259,223 entitled, "Impression Control Apparatus Employing Two Sets of Stops," invented by W. A. Heidt et al., and assigned to the assignee of the present invention.

OPERATION

With reference to Figure 1, depression of a letter keybutton 43 by the operator causes the keylever 45 to pivot downward about fulcrum rod 47 whereby lug 49 contacts the top lug 51 of the cam trip lever 53. The cam lever 53 pivots down against the print cam 31, causing the serrated teeth 35 of the print cam to engage the continuously rotating power roll 39. Engagement with the power roll causes the print cam to rotate and the print cam then forces the cam lever assembly 27 to pivot about the cam lever fulcrum rod 29. The cam lever action pulls on the typebar link 25, causing the typebar to pivot about pivot pivot wire 13 thereby driving the typehead 21 toward the platen (not shown). Before the typehead 21 reaches the platen, the end portion 37 of the print cam 31 meets knock-off finger 61. For certain preselected typebars having small characters thereon, the side portion 163 of the print cam 31 may enagage the secondary knock-off screw 161 thereby precluding the end portion 37 from engaging its associated knock-off finger 61. In either instance, the rotation of the print cam 31 is stopped upon engagement of either end portion 37 or side portion 163 with their associated stops, knock-off finger 61 and secondary knock-off screw 161 respectively. Even though the print cam 31 is stopped at this point, the momentum of the typebar 11 continues the motion of the cam lever 27 and the travel of the typebar to the platen. The continued motion of the cam lever 27 releases the print cam 31 from the power roll 39 and the print cam spring 41 restores the print cam 31 to rest against the cam lever 27.

The striking force of each typebar is determined by the distance that its associated print cam is allotted to travel on the power roll 39 before its end portion 37 or its side portion 163 reach their respective stops. The longer the print cam remains engaged with the power roll, the further the typebar will be powered and the greater will be the striking force. As mentioned above, certain preselected typebars have secondary knock-off screws 161 associated therewith and thus the length of travel of the print cam on the power roll when typing in high density settings is determined by the clearance distance between the side portion 163 of print cam 31 and its corresponding secondary knock-off screw 161. For the purposes of the following discussion, it will be assumed that the typebar described does not have an associated secondary knock-off screw 161 associated therewith.

For the typebar to be described, the length of travel of the print cam on the power roll is determined by the print cam clearance distance between the end portion off screw 59 are adjustable to vary this clearance distance 37 of the print cam 31 and its associated knock-off finger 61. Upper case knock-off screw 57 and lower case knock-off screw 59 are adjustable to vary this clearance distance and hence the striking force of each typebar so that all typebars will print with an approximate uniform impression. For example, the striking force requirement of a "m" typebar would be more than that required for that of the "i" typebar. Therefore, the lower case knock-off screw 59 associated with the typebar having an "m" thereon would be adjusted so as to inhibit the associated print cam 31 at a later point in its travel than the print cam associated with the "i" typebar. Similarly, the upper case knock-off screw 57 associated with the typebar having an "M" thereon would be adjusted so as to inhibit the associated print cam 31 at a later point in its travel than the print cam associated with the "I" typebar. Since the geometry of the typebar linkage causes the typebar to be propelled toward the platen at a higher velocity when typing upper case characters than when typing lower case characters, it can be readily appreciated by those skilled in the art that the upper case knock-off screw 57 is adjusted to inhibit its associated print cam 31 at an earlier point in its travel than the inhibition caused by the adjustment of the corresponding lower case knock-off screw 59.

Additionally, typebars located in the center of the type basket are propelled toward the platen with a greater velocity than those located at the edge of the type basket. For example, the typebar having a "Y" and a "y" thereon is usually located at the center of the type basket while that having an "A" and an "a" thereon is usually located on the left-hand side of the type basket. Assuming that the type style is such that the surface areas of the upper case characters are approximately equal to each other as are the surface areas of the lower case characters, it can be readily appreciated that both the upper case knock-off screw 57 and the lower case knock-off screw 59 associated with the typebar having the "A" and "a" thereon would be adjusted as to inhibit the associated print cam 31 at a later point in its travel than the inhibition of the print cam 31 associated with the "Y" and "y" typebar.

Thus, for a given group density impression setting, the upper case knock-off screws 57 and the lower case knock-off screws 59 may be adjusted so as to effect precise impression uniformity and all of the characters will print with uniform density at the given group impression setting at which adjustment of the knock-off screws is made.

Figure 3:
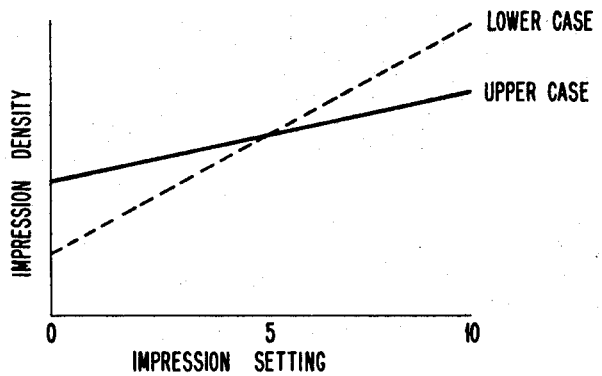
FIGURE 3 is a graph of print density versus group impression setting of a typebar on a typewriter which does not have the range matching group density feature of the present invention.

As previously discussed, both the striking force applied and the surface area of the upper and lower case characters on a single typebar differ. Because of these differences, a fixed change in striking force causes a non uniform change in the density of the printed character as between the upper case character and the lower case character located on the same typebar. FIGURE 3 is a graph showing the print density as a function of a group impression settings of a typical typebar on a typewriting machine having both upper and lower case knock-off wherein the group impression control causes the print cam clearance distance and hence the striking force of the typebar to be changed uniformly for both upper case and lower case characters. (The group impression setting being a function of the print cam clearance distance.) The topmost line is representative of a typical upper case character impression curve while the lower line is representative of the lower case character impression curve of the same typebar. An examination of the graph shows that the lower case character print density is relatively light at the lower impression settings. This is because the upper case characters fade less rapidly at the lower setting and, therefore, in contrast with the lower case, are darker. In the middle range of impression settings, the upper case characters and the lower case characters are shown as balanced since it is assumed that they were balanced in this range by the adjustment of lower case adjustment means such as adjustment screw 59 and the upper case adjustment means such as adjustment screw 57. In the high impression setting range, the lower case characters have gained sufficiently in force input to cut and emboss the original copy.

Thus, it can be seen that for prior art machines having individual adjustment mechanisms for both upper case and lower case characters, the densities for the upper case and lower case characters on the same typebar can be approximately uniform only over a small range of group control settings.

Referring now to FIGURE 2, in order to achieve approximate uniform density of both upper and lower case characters throughout an entire range of group impression control settings, a novel mechanism is shown by which a simple adjustment enables one to match the impression density of upper case characters with that of lower case characters throughout an entire impression range, and which, further allows this density matching regardless of the type style utilized. For example, this mechanism allows density matching of upper case and lower case characters in a machine having large upper case characters with respect to the size of the lower case characters. This mechanism can also be utilized in a different but similar machine to achieve density matching when the size of the upper case characters is smaller than that of the lower case characters.

Density uniformity is achieved by moving the primary knock-off bar 55 a different vertical increment when typing upper case characters than when typing lower case characters for the same excursion of the density control lever 101. Additionally, when typing upper case characters, the vertical increment moved by the primary knock-off bar 55 can be varied from one fixed amount to another for the same excursion of density control lever 101 without affecting the vertical increment that the knock-off bar 55 travels during the same excursion of density control lever 101 when typing lower case characters. This allows the impression curves of the upper case characters to be varied to match the fixed impression curves of the lower case characters. Further, the mechanism shown in FIGURE 2 allows the impression range of both the upper case character and the lower case character to be readily varied by means of a simple additional adjustment.

In the description which follows, the operation of the mechanism which allows the upper case character impression curves to be matched to the lower case impression curves as a group over the complete range of density settings and which allows the impression range and hence the impression curves of both upper and lower case characters to be varied as a group will be described.

In order to vary the print density for all of the type characters as a group over a range of desired density settings, density control lever 101 is rotated about fixed pivot stud 103. This rotation causes the range control member 109 to rotate which in turn causes the rotation of shaft 115 and impression cam 119 eccentrically mounted on the shaft. The amount of rotation imparted to the eccentrically mounted impression cam 119 is a function of both the angle through which the density control lever 101 is rotated and the connection of link 107 to one of the holes 111 in the range control member 109. When the density control lever 101 is rotated counter-clockwise to a stop which predetermines its zero impression setting, link 107 can be connected by pin 113 to any of the holes 111 in the range control member 109 without rotating the range control member or the density control lever. That is, in this position, the holes 111 are on an equal radius from the pivot point of link 107. Thus, the impression cam 119 will always be aligned at the same point relative to the flat surface 123 of the cam follower arm 121 when the density control lever 101 is at its zero position. As the density control lever 101 is rotated clockwise to its uppermost impression setting, cam 119 will rotate an amount dependent upon the selective connection of link 107 to one of the holes 111. That is, for a complete excursion of density control lever 101 from its lower-most density setting to its upper-most density setting, the cam 119 will rotate through a larger angle if link 107 is pinned to hole 111A than it would if link 107 were pinned to any of the remaining holes. When the link is pinned to hole 111D, the impression cam 119 rotates through the smallest angle possible.

Rotation of the impression cam 119 from a high dwell point with respect to the flat surface 123 to a low dwell point causes the primary knock-off bar 55 to move downward hence increasing the cam clearance distance of all typebar positions as will be discussed hereinafter. For a given excursion of density control lever 101, the angle through which the impression cam 119 is rotated defines the amount of vertical movement of the primary knock-off bar and hence the impression range of the typebars as a group. (This assumes that the impression range matching controls to be discussed hereinafter remain fixed.)

Figure 4:
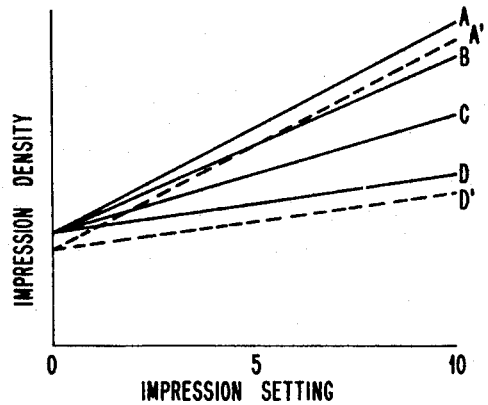
FIGURE 4 is a graph of print density versus group impression setting of a typebar of a typewriter incorporating the impression range control feature of the present invention.

Referring now to FIGURE 4 of the drawings, a graph is shown of a typewriter incorporating the impression range control of the present invention. The curve labeled "A" represents the density variation of a typical typebar when link 107 of FIGURE 2 is connected to hole 111A of the range control member 109. Similarly, the curve labeled "B" in FIGURE 4 corresponds to the connection through hole 111B, the curve labeled "C" corresponds to the connection through hole 111C and the curve labeled "D" corresponds to the connection through hole 111D. These curves are shown as approximately linearly spaced because the impression cam 119 of FIGURE 2 is depicted as having an approximately linear rise. That is, for a given angular change of the impression cam, there will be a corresponding angular change in the cam follower arm 121 about its pivot, rod 63, regardless of the initial angular position of the impression cam 119. However, as appreciated by those skilled in the art, impression cam 119 can have varying gradients thereby causing a more uneven spread of the curves A, B, C and D in FIGURE 4.

The impression range control affects the print impression of lower case characters as well as upper case characters. The curves labeled $A^1$ and $D^1$ represent the density variations of the lower case character located on the same typebar as the upper case character depicted in curves A to D. It can be seen that the density variations effected by the impression range control are substantially the same for both upper and lower case characters.

Referring once again to FIGURE 2, it has been seen how the impression range of all of the typebars as a group can be varied by selectively connecting link 107 to one of the holes 111 of the range control member 109. This selective connection affects the print density of both the upper and lower case characters as a group over the range of density settings effected by rotating the density control lever 101.

In the discussion which follows, the range matching mechanism will be discussed. This mechanism allows the upper case impression curves to be matched to the lower case impression curves of the typebars as a group.

As mentioned above, rotation of cam 119 causes cam follower arm 121 to rotate about rod 63. Rotation of the cam follower arm causes the gyration control plate 127 to move in a direction determined by the alignment of the slot in the slotted guide 133 of the impression ratio control guide 135. Vertical motion of the gyration control plate 127 is translated to corresponding vertical motion of the primary knock-off bar 55 through the internally cut kidney shaped cam 143, roller 141, and the stud 140. Additionally, certain horizontal motion of the gyration control plate 127 is translated into vertical motion of the primary knock-off bar 55 as will be described hereinafter. Vertical motion of the primary knock-off bar 55 causes both the lower case knock-off screws 59 and the upper case knock-off screws 57 mounted to the knock-off bar to move a corresponding vertical distance. Vertical movement of the knock-off screws causes the knock-off fingers 61 to pivot about rod 63. When the primary knock-off bar 55 is raised thereby causing the knock-off finger 61 to pivot in a clockwise direction about the rod 63, column springs 64 buckle an additional amount. The column springs bias the knock-off fingers 61 against the knock-off screws. It is to be noted that the knock-off fingers 61 rest upon either lower case knock-off screws 59 or upper case knock-off screws 57. They are depicted in FIGURE 2 as resting upon the lower case knock-off screws 59.

When the lower case knock-off screws 59 move upward causing the knock-off fingers 61 to pivot in a clockwise direction, the print cam clearance distance for all typebar positions is decreased. A decrease in the print cam clearance distance shortens the time duration during which the print cams 31 engage the power roll. This results in a smaller force being applied to the typebars and hence lighter print impression. When the primary knock-off bar is lowered, the knock-off fingers 61 pivot counterclockwise about rod 63 under the bias of springs 64 thereby increasing the print cam clearance distance of all type positions as a group. This results in heavier print impressions for all typebar positions.

As mentioned above, the knock-off fingers 61 rest either upon the upper case knock-off screws 57 or the lower case knock-off screws 59. The selection of which set of knock-off screws the knock-off fingers rest upon is accomplished by rotating the primary knock-off bar 55 about its pivot axis through stud 67. This rotation is effected by the movement of link 68 to the left or to the right in response to rotation of the shift control mechanism 69. As shown in FIGURE 2, link 68 is in its right-most position with the result that the lower case knock-off screws 59 support the knock-off fingers 61. When link 68 is moved to the left, it effects a pull through the pin connection 70 on bracket 71 which is attached to the primary knock-off bar 55 by adjusting screws 151. This movement causes the primary knock-off bar to pivot about its pivot axis through stud 67 and assume a position wherein the upper case knouk-off screws 57 support the knock-off fingers 61.

Figure 5:
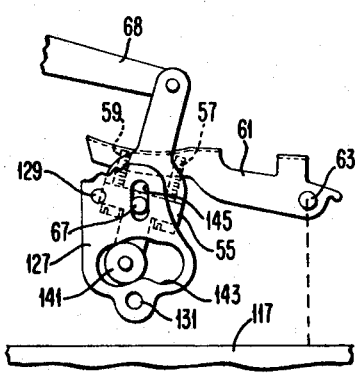
FIGURE 5 is a partial cross sectional side elevation view of the range matching mechanism and the primary knock-off bar in its lower case position.

Referring now to FIGURE 5, a partial cross sectional side elevation view of the range matching mechanism is shown. The primary knock-off bar 55 is shown in the lower case position with its roller 141 resting within the left-hand side of the kidney-shaped cam 143 of the gyration control plate 127. Knock-off finger 61 pivotedly mounted on rod 63 is shown resting upon lower case knock-off screw 59. Rod 63 is fixedly mounted to the machine frame 117 and hence, the pivot point of the knock-off finger 61 does not vary with movement of the gyration control plate 127 or movement of the primary knock-off bar 55. When link 68 is pulled to the left under the control of the shift mechanism, the primary knock-off bar pivots about its pivot axis through stud 67 and assumes the position shown in FIGURE 6.

Figure 6:
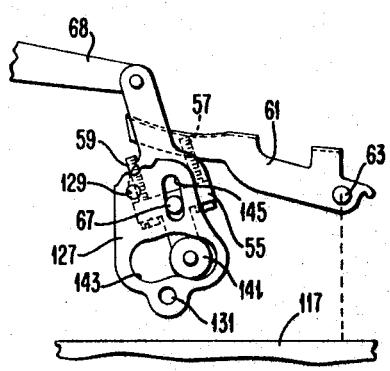
FIGURE 6 is a partial cross sectional side elevation view of the range matching mechanism and the primary knock-off bar in its upper case position.

Referring now to FIGURE 6, it is seen that knock-off finger 61 now rests on the upper case knock-off screw 57, and due to the height of the upper case knock-off screw, the knock-off finger has been rotated in a clockwise direction about its pivot, rod 63. This rotation of the knock-off finger 61 causes the print cam clearance distance to be decreased in a manner similar to that described above. It is noted that stud 67 did not translate in guide slot 145 when shifting from lower case as depicted in FIGURE 5 to upper case as depicted in FIGURE 6. This is because the distance from the center of stud 67 to the surface of the kidney shaped cam 143 upon which the roller 141 is resting in FIGURE 5 is the same as the distance from the center of the stud 67 to the surface of the kidney shaped cam 143 upon which the roller 141 is resting in FIGURE 6. This has been depicted in this manner primarily for the purposes of illustrating the flexibility of the present mechanism. As will be appreciated from an understanding in the following description, stud 67 generally translates in the guide slot 145 when shifting from one case to another. This is because the distance from the center of stud 67 to the right-hand surface of the kidney shaped cam 143 is generally different than the distance from the center of stud 67 to the left-hand surface of kidney shaped cam 143.

It is to be noted from the above discussion that the gyration control plate 127 does not move when shifting from upper case to lower case or vice versa. Movement of the gyration control plate is effected only through the rotation of density control level 101 in FIGURE 2. Thus, for a given density setting, the upper case knock-off screws 57 and the lower case knock-off screws 59 can be adjusted to a desired height so as to effect uniform print impression for both the upper case and the lower case character on the same typebar. As seen by comparing FIGURES 5 and 6, the knock-off screws are adjusted so that the knock-off fingers 61 normally pivot clockwise when shifting from lower case to upper case thus reducing the print cam clearance distance. The knock-off screws are generally adjusted in this manner to compensate for the typebar linkage geometry changes which were described above that occur when shifting from one case to another. It is, however, possible to adjust the present mechanism so that the knock-off finger 61 pivots counterclockwise when shifting from lower case to upper case. This would be done in those instances where the type font on the typebars have larger lower case surface area than the surface area of the upper case characters.

Referring once again to FIGURE 2, an important feature of the present invention is the range matching feature effected by the gradient control adjustment means whereby the print density of the upper case characters is changed over the entire range of impression settings with respect to the print density of the lower case characters. The change in gradient of the upper case density curve is achieved by making a simple adjustment to the typewriter machine. The ease of this adjustment allows for ready manufactureability of typewriters having various stypes of type font without sacrificing print density uniformity as between upper case and lower case characters over a wide range of print density settings.

As discussed above, rotation of the print density control lever 101 causes cam follower arm 121 to rotate about rod 63. The rotation of the cam follower arm causes the gyration control plate which is pivotedly pinned thereto with pin 129 to move in a direction determined by the alignment of the slotted guide 133. Referring now to FIGURE 5, it will be assumed that the slot in the slotted guide is aligned in a vertical direction thereby causing the gyration control plate to move only in a vertical plane. Further, it will be assumed that rotation of the cam follower arm is such as to cause the gyration control plate to move in an upward direction. When the gyration control plate moves upwardly, it will carry therewith the primary knock-off bar 55 and both the gyration control plate and the primary knock-off bar will translate from their position shown in FIGURE 5 to the position shown in FIGURE 7.

Figure 7:
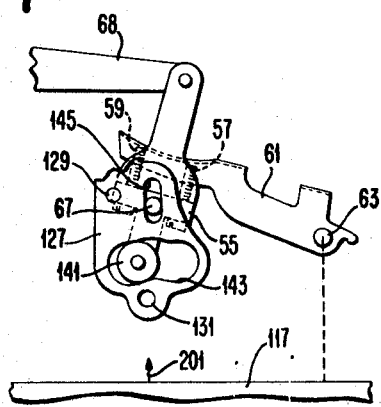
FIGURE 7 is a partial cross sectional side elevation view of the range matching mechanism and the primary knock-off bar after a vertical translation of the gyration control plate from the position shown in FIGURE 5.

Referring now to FIGURE 7, the gyration control plate 127 and the primary knock-off bar 55 have been moved in a vertical direction in the direction of arrow 201 a distance equal to the length of arrow 201 from the position that it was in as depicted in FIGURE 5. It is noted that the vertical translation of the knock-off bar 55 resulted in the vertical translation of lower case knock-off screw 59 a distance equal to the length of arrow 201. The vertical movement of the lower case knock-off screw 59 caused the knock-off finger 61 to rotate about rod 63 in a clockwise direction thereby reducing the cam clearance distance.

Figure 8:
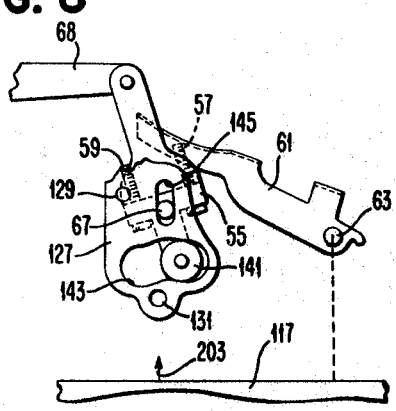
FIGURE 8 is a partial cross sectional side elevation view of the range matching mechanism and the primary knock-off bar after a vertical translation of the gyration control plate from the position shown in FIGURE 6.

Referring now to FIGURE 8, the gyration control plate 127 is shown after movement in the direction of arrow 203 a distance equal to the length of arrow 203 from its position depicted in FIGURE 6. It is noted that the length and direction of arrow 203 is identical to that of arrow 201 which is shown in FIGURE 7. Both FIGURES 6 and 8 depict the primary knock-off bar 55 as resting in its upper case position. It can be seen that the upper case knock-off screw 57 has moved a vertical distance equal in length to the arrow 203. The vertical movement of this knock-off screw causes the knock-off finger 61 to rotate about its pivot, rod 63. Because the moment arm from the upper case knock-off screw to the fulcrum point of the knock-off finger 61 is shorter than the moment arm from the lower case knock-off screw 59 to the fulcrum point of the knock-off finger 61 as depicted in FIGURE 7, the knock-off finger 61 is shown as having rotated through a greater angle for the same veritcal movement of the primary knock-off bar 55 when in the upper case position as shown in FIGURE 8 than when in the lower case position as shown in FIGURE 7.

It is to be noted with respect to both FIGURES 7 and 8 that the roller 141 connected to the primary knock-off bar 55 did not change its position with respect to kidney shaped cam 143 of the gyration control plate 127.

Figure 9:
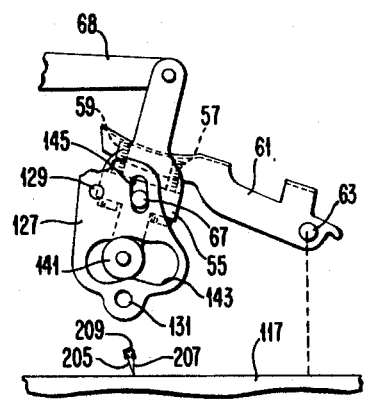
FIGURE 9 is a partial cross sectional side elevation view of the range matching mechanism and the primary knock-off bar after a vertical and horizontal translation from the position shown in FIGURE 5.

Referring now to FIGURE 9, the gyration control plate 127 and primary knock-off bar 155 are shown after they have been translated in the direction of arrow 205 a distance equal in length to arrow 205 from the position shown in FIGURE 5. It can be seen that in this instance, roller 141 has rolled to the right in the kidney shaped cam 143 from the position in which it is depicted in FIGURE 5. Additionally, the gyration control plate 127 has moved vertically a distance equal to the vertical component 207 of arrow 205. This causes the primary knock-off bar 55 and hence the lower case knock-off screw 59 to move a corresponding vertical distance. The amount of movement of roller 141 to the right in the kidney shaped cam 143 is determined by the horizontal component 209 of arrow 205. Since all of the points along the surface of the left-hand side of the kidney shaped cam 143 are equidistant from the pivot axis of the gyration control plate 127 which passes through pivot pin 129, movement of roller 141 in the kidney shaped cam has no effect in the vertical height of the primary knock-off bar 55 and its associated lower case knock-off screw 59. Hence, when typing lower case characters, the direction of movement of the gyration control plate has no affect on the gradient of the lower case print density curve.

Figure 10:
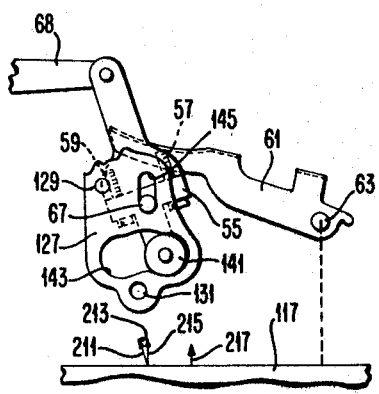
FIGURE 10 is a partial cross sectional side elevation view of the range matching mechanism and the primary knock-off bar after a vertical and horizontal translation from the position shown in FIGURE 6.

Referring now to FIGURE 10, the gyration control plate 127 and the primary knock-off bar 55 are shown after they have been translated in the direction of arrow 211 a distance equal to the length of arrow 211 from their position depicted in FIGURE 6. It is to be noted that roller 141 has moved to the right in kidney shaped cam 143 a distance proportional to the horizontal component 213 of arrow 211. With reference to FIGURE 6, it can be seen that the points along the right hand surface of the kidney shaped cam 143 are not of equal distance from the center of pivot pin 129 about which the gyration control plate 129 rotates. Thus, when roller 141 rolls to the right in the kidney shaped cam, stud 67 of the primary knock-off bar 55 translates in a vertical direction within guide slot 145. Referring once again to FIGURE 10, it can be seen that the stud 67 has translated in a downward direction within guide slot 145. Thus, the horizontal motion of roller 141 in the kidney shaped cam 143 has resulted in the vertical downward motion of stud 67 and primary knock-off bar 55. Additionally, the gyration control plate 127 has been moved in the vertical direction a distance equal to the vertical component 215 of arrow 211. This motion causes the primary knock-off bar 55 to move upward in a vertical direction. Since the vertical motions are subtractive, the net vertical movement of the primary knock-off bar represented by arrow 217 is upward resulting in a small clockwise motion of knock-off finger 61. Even though the vertical component 215 of arrow 211 is shown as being of equal length with the vertical arrow 205 of FIGURE 8, the net vertical distance moved by the primary knock-off bar 55 in FIGURE 10 is less than the distance moved of the primary knock-off bar 55 of FIGURE 8.

Thus, alignment of the slot of the slotted guide 133 determines the amount of vertical motion imparted to the primary knock-off bar 55 upon rotation of the density control lever 101 of FIGURE 2 when the shift mechanism is in upper case while its alignment has no effect on the amount of vertical motion of the primary knock-off bar 55 when the shift mechanism is in lower case. This feature allows the print density effected by the upper case characters of all of the typebars to be varied with respect to the print density effected by the lower case characters of the typebars over the complete density range. Stated otherwise, the gradient of the upper case density curve may be varied with respect to the lower case density curve without affecting the lower case curve.

Figure 11:
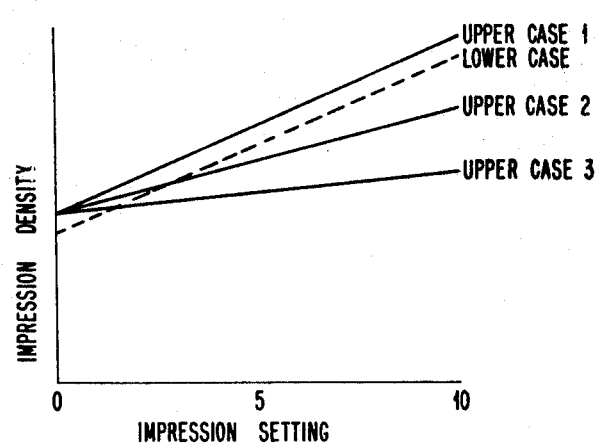
FIGURE 11 is a graph of print density versus group impression setting of a typebar of a typewriter having the range matching feature of the present invention.

For example, referring to FIGURE 11, the print density effected by both the upper and the lower case characters of a typical typebar is depicted through the group density impression range for different settings of the slotted guide 133 of FIGURE 2. The curve labeled upper case 1 corresponds to an angular position of the slot of slotted guide 133 which would cause horizontal movement of the gyration control plate 127 in such a direction that the greatest amount of vertical downward movement of the primary knock-off bar 55 of FIGURE 2 is effected by rotating the density control lever 101 from the "0" density impression setting to the "10" density impression setting. The curve labeled upper case 3 would correspond to the angular alignment of the slot of slotted guide 133 which causes the least amount of downward vertical movement of the primary knock-off bar 55 when rotating the density control lever 101 from setting 0 to setting 10. Of course, since the alignment of the slot of slotted guide 133 of FIGURE 2 has no effect on the vertical movement of primary knock-off bar 55 when typing lower case characters, the curve labeled lower case remains the same throughout the variation of the slot alignment. Thus, the gradient of the upper case curve has been changed while the lower curve remains the same.

It is readily apparent that the curves intersect one another at the zero setting. With reference to FIGURE 2, this is accomplished by causing guide pin 131 of the gyration control plate 127 to rest at the midpoint of the slotted guide 133 when the density control lever 101 is rotated to its "0" position. At this position, rotation of impression ratio control guide 135 will not translate the guide pin 133 since the impression ratio control guide 135 rotates about an axis through the center of the slot of the slotted guide 133.

While it is usually desirous to adjust the slotted guide 133, FIGURE 2, so that there is virtual density uniformity as between upper case and lower case characters throughout the entire impression range, it will be appreciated by those skilled in the art that the ability to change the relationship of the upper case character impression curves with respect to that of the lower cast characters is a highly desirous feature when manufacturing typewriters of a standard design wherein the typebar characters thereon may vary from machine to machine in accordance with type font and features desired by the ultimate user. By making a simple adjustment of the slotted guide 133, print density uniformity can be achieved throughout a wide range of impression settings without regard to the style of type font utilized on the typebars.

Additionally, for those few styles of type wherein complete density uniformity cannot be achieved throughout the entire range of impression control settings, the range control mechanism described above can be utilized to reduce the entire range for both upper and lower case characters with a resulting change in the print impression curves as discussed above with respect to the range control mechanism. The upper case impression curve can then be varied with respect to the lower case impression curve within the reduced impression range to achieve print density uniformity over the range of possible density settings. This variation is accomplished by adjusting the range matching mechanism.

Further, the usable density range defined by the range control mechanism does not have to be appreciably reduced in order to compensate for a few typebars which have small surface areas such as the period "." or comma "," because of the secondary knock-off feature. The combinational utilization of secondary knock-off with range matching and impression range control results in a simple to adjust mechanism having virtually uniform print density for all typebar characters over a wide range of print density settings.

While the invention has been particularly shown and described with reference to a perfered embodiment thereof it would be understood by those skilled in the art to the foregoing and other changes in form and detail may be made therein without departing from the scope of the invention.

What is claimed is:

1. In a typewriting machine having a plurality of typebars, each typebar having an upper case and a lower case character, said typewriting machine also having a plurality of driving means selectively operable to drive an associated typebar to its printing position, and shifting means for selecting which case character will be typed, impression control apparatus comprising:

a first member;

a plurality of individually adjustable stops, each of said stops being associated with a driving means to regulate the driving force imparted to an associated typebar by the driving means;

a first group impression control means operable over a total range of impression settings connected in driving relationship to the first member to vary by a first predetermined amount the driving force imparted to each of said typebars by said driving means as a group over a predetermined range of impression settings;

second group impression control means operable over said total range of impression settings connected in driving relationship to the first member to vary by a second predetermined amount the driving force imparted to each of said typebars by said driving means as a group over said predetermined range of impression settings whereby the ratio of said first predetermined amount to said second predetermined amount for each typebar is a defined value;

range matching means operable on said first and said second group impression control means to effect a change in said ratio simultaneously for all typebars;

actuating means responsive to said shifting means for selectively actuating one of said group impression control means when typing upper case characters and for actuating the other of said group impression control means when typing lower case characters.

2. The impression control apparatus set forth in claim 1 wherein said range matching means is operable upon said first group impression control means to keep said first predetermined amount constant and operable upon said second group impression control means to vary said second predetermined amount and to thereby effect a change in said ratio.

3. The impression control apparatus set forth in claim 1 and having a second plurality of individually adjustable stops associated with a like plurality of preselected typebars having characters thereon of small surface area with respect to the characters of other typebars, said second plurality of stops being effective to regulate the driving force imparted to their associated typebars by said driving means over a fixed portion of the total range of impression settings of said first and second group impression control means, said second plurality of individually adjustable stops causing said plurality of individually adjustable stops associated with said preselected typebars to become ineffective to regulate said driving force over said fixed portion of said total range.

4. The impression control apparatus set forth in claim 1 wherein said range matching means is not operable on said first and said second group impression control means at a predetermined impression setting within the total range of impression settings.

5. The impression control apparatus set forth in claim 1 having range control means operable to vary the total range of impression settings over which said first and said second group impression control means are operable.

6. The impression control apparatus set forth in claim 1 wherein a first group of said plurality of individually adjustable stops regulate the driving force imparted to their associated typebars by said driving means when said shifting means selects lower case characters to be typed, the remaining group of individually adjustable stops regulating the driving force imparted to their associated typebars by said driving means when said shifting means selects upper case characters to be typed.

7. The impression control apparatus set forth in claim 6 wherein said plurality of individually adjustable stops are mounted upon said first member.

8. In a typewriting machine having a plurality of typebars, each typebar having thereon an upper case and a lower case character, said typewriting machine also having shifting means for selecting the case of the character to be typed, an impression control mechanism comprising:

a plurality of driving means each associated with a single typebar and selectively actuatable to drive their associated typebars partly through the distance which said typebars must travel to effect a print impression on a document media, the distance travelled by said typebars when driven by their associated driving means being variable to thereby vary the print impression said typebars cause to be made on the document media;

a support member;

a plurality of finger members each associated with a driving means and each pivotedly mounted on said support member to rest at a predetermined angle with respect to the horizontal, the angle at which each finger member rests determining the distance travelled by its associated typebar under the drive of its associated driving means;

a first plurality of individually adjustable members for determining the angle of rest of said finger members when said shifting means is in upper case;

a second plurality of individually adjustable members for determining the angle of rest of said finger members when said shifting means is in lower case;

a first group impression control means selectively actuatable by said shifting means to vary the angles of rest of said finger members simultaneously as a group over a predetermined range of impression settings when said shifting means is in lower case;

a second group impression control means selectively actuatable by said shifting means to vary the angles of rest of said finger members simultaneously as a group over said predetermined range of impression settings when said shifting means is in upper case; and range matching means operable on said group impression control means to simultaneously vary the amount of variation of said angles of rest effected by said group impression control means over said predetermined range of impression settings.

9. The impression control mechanism set forth in claim 8 having:
a plurality of biasing means associated with said finger members to bias said finger members against said individually adjustable members.

10. The impression control mechanism set forth in claim 8 having:
a third plurality of individually adjustable stops associated with a like plurality of preselected typebars having thereon characters of small surface area with respect to the characters of the other typebars, said third plurality of individually adjustable stops being effective to regulate the distance the driving means drive their associated preselected typebars over a fixed portion of said predetermined range of impression settings of said first and second group impression control means, said third plurality of individually adjustable stops preventing the plurality of finger members associated with said preselected typebars from regulating the distance that said driving means drive their associated preselected typebars over said fixed portion of said range.

11. The impression control mechanism set forth in claim 8 having:
range control means to vary the total range over which said first and second group control means are operable to change the angles of rest of said members.

References Cited

UNITED STATES PATENTS

| | | | |
|---|---|---|---|
| 2,344,167 | 3/1944 | Pitman | 197—17 |
| 2,750,022 | 6/1956 | Long | 197—17 |
| 2,796,966 | 6/1957 | Toeppen | 197—17 |
| 3,077,255 | 2/1963 | Coleman et al. | 197—17 |
| 3,233,714 | 2/1966 | Meinherz et al. | 197—17 |
| 3,250,365 | 5/1966 | Klingner et al. | 197—17 |
| 3,250,366 | 5/1966 | Rix et al. | 197—17 |
| 3,259,223 | 7/1966 | Heidt et al. | 197—17 |

ROBERT E. PULFREY, *Primary Examiner.*

E. S. BURR, *Assistant Examiner.*